(12) United States Patent
Eidsvig et al.

(10) Patent No.: US 12,629,597 B2
(45) Date of Patent: May 19, 2026

(54) VIDEO GAME EXECUTION VALIDATION

(71) Applicant: Las Vegas Sands Corp., Las Vegas, NV (US)

(72) Inventors: Garrett Jason Eidsvig, Kelowna (CA); Benjamin William Flint, Seattle, WA (US); Tiago Keller Ferreira, Calgary (CA); Johnathon Randal Pasion, Lima, OH (US)

(73) Assignee: Las Vegas Sands Corp., Las Vegas, NV (US)

( * ) Notice: Subject to any disclaimer, the term of this patent is extended or adjusted under 35 U.S.C. 154(b) by 0 days.

(21) Appl. No.: 19/269,773

(22) Filed: Jul. 15, 2025

(65) Prior Publication Data

US 2026/0021412 A1    Jan. 22, 2026

Related U.S. Application Data

(60) Provisional application No. 63/672,407, filed on Jul. 17, 2024.

(51) Int. Cl.
*A63F 13/47* (2014.01)
*A63F 13/73* (2014.01)

(52) U.S. Cl.
CPC .................................... *A63F 13/73* (2014.09)

(58) Field of Classification Search
None
See application file for complete search history.

(56) References Cited

U.S. PATENT DOCUMENTS

| | | | |
|---|---|---|---|
| 8,246,471 B2 * | 8/2012 | Dutilly .................. | A63F 13/497 |
| | | | 463/43 |
| 8,562,441 B1 | 10/2013 | Martone | |
| 9,814,978 B2 | 11/2017 | Hutcheson et al. | |
| 10,245,510 B2 * | 4/2019 | Kim ........................ | A63F 13/47 |
| 10,537,809 B2 * | 1/2020 | Haile ....................... | A63F 13/73 |
| 2010/0138775 A1 | 6/2010 | Kohen et al. | |

FOREIGN PATENT DOCUMENTS

KR     10-2012-0081360 A     7/2012

OTHER PUBLICATIONS

Tian et al., "Behavior-based Cheat Detection in Multiplayer Games with Event-B," IFM 2012, LNCS 7321, 2012, in 15 pages.

* cited by examiner

*Primary Examiner* — Sunit Pandya

(74) *Attorney, Agent, or Firm* — Knobbe, Martens, Olson & Bear, LLP

(57)                ABSTRACT

A system may validate execution of a video game to identify the existence of a coding error or of cheating by a video game player. The system can record action events performed by a video game within an action event log, which may be provided to a validation system that can repeat the action events identified in the action event log. By comparing a state of the video game with a state generated by the validation system responsive to repeating the action events, the system can determine whether a coding error exists or if a user is cheating (e.g., using cheat software) when playing the video game. Further, the system can use isomorphic code enabling the validation system to repeat the action events independent of the system hosting the video game. Thus, the system hosting the video game may continue to execute the video game while validation occurs.

23 Claims, 4 Drawing Sheets

VIDEO GAME EXECUTION VALIDATION PROCESS

VIDEO GAME EXECUTION VALIDATION

INCORPORATION BY REFERENCE

This application claims priority to U.S. Provisional Application No. 63/672,407 filed on Jul. 17, 2024, which is hereby incorporated by reference herein for all purposes. Any and all applications for which a foreign or domestic priority claim is identified in the Application Data Sheet as filed with the present application are hereby incorporated by reference under 37 CFR 1.57.

TECHNICAL FIELD

The present disclosure generally related to video games. More specifically, the present disclosure relates to the validation of the execution of a video game.

BACKGROUND

Video games are typically complex pieces of software. While many types of software are designed to be deterministic, video games are often designed to have some degree of randomness to, for example, enhance replayability. The nondeterminism of many video games can increase the challenges of testing the video game code. For at least this reason, it is often the case that many video games include coding errors or bugs after release to the public. Thus, it is desirable for a developer or publisher of video games to be able to test numerous test cases prior to release of the video game and, in some cases, to be able to continue performing tests of the video game after release of the video game.

Some users will cheat or attempt to cheat when playing a video game. For some video games, such as single player video games, cheating is a minor problem if a problem at all. However, for many other video games, cheating can be problematic because, for example, it may give certain users an advantage over other users, which can impact the enjoyment and consequently the retention of certain users who play the video games. Thus, it is desirable to identify users who cheat and to take action to reduce or prevent the impact of cheating on other users.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a computer-implemented method of validating execution of video game code of a video game, the computer-implemented method including: by a server computing system including one or more hardware processors and configured to execute a server-side portion of the video game, receiving an action event log from a client computing system configured to execute a client-side portion of the video game, wherein the action event log includes an identity of a first set of action events triggered during execution of the client-side portion of the video game at the client computing system, wherein the first set of action events are performed with respect to a first model within the client-side portion of the video game and cause a change in a state of the first model, and wherein the action event log further includes an identity of the state of the first model; executing a second set of action events corresponding to the first set of action events identified in the action event log, wherein the second set of action events are executed with respect to a second model within the server-side portion of the video game and corresponding to the first model, and wherein the second set of action events are executed at least a minimum time period subsequent to execution of the first set of action events with respect to the first model; determining a state of the second model subsequent to execution of the second set of action events; comparing the state of the second model to the state of the first model as identified in the action event log to obtain a comparison result; and executing a contextual action based at least in part on the comparison result.

In some aspects, the techniques described herein relate to a computer-implemented method, wherein the second set of action events are executed by isomorphic code of the server-side portion of the video game.

In some aspects, the techniques described herein relate to a computer-implemented method, wherein, in response to determining that the comparison result indicates that the first model matches the second model, executing the contextual action includes registering an update to the state of the first model or the state of the second model.

In some aspects, the techniques described herein relate to a computer-implemented method, wherein, in response to determining that the comparison result indicates that the first model does not match the second model, executing the contextual action includes replacing the first model with the second model at the client computing system.

In some aspects, the techniques described herein relate to a computer-implemented method, wherein replacing the first model with the second model includes modifying a current state of the first model with the state of the second model.

In some aspects, the techniques described herein relate to a computer-implemented method, wherein, in response to determining that the comparison result indicates that the first model does not match the second model, executing the contextual action includes outputting an indication of a software bug in the video game code of the video game.

In some aspects, the techniques described herein relate to a computer-implemented method, wherein, in response to determining that the comparison result indicates that the first model does not match the second model, executing the contextual action includes outputting an indication of an occurrence of cheating by a user interacting with the client-side portion of the video game.

In some aspects, the techniques described herein relate to a computer-implemented method, wherein the first set of action events include a series of action events performed over a first time period of interaction with the client-side portion of the video game.

In some aspects, the techniques described herein relate to a computer-implemented method, wherein the second set of action events include the series of action events, and wherein the second set of action events are performed over a second time period that is a fraction of a length of the first time period.

In some aspects, the techniques described herein relate to a computer-implemented method, wherein the server computing system interacts with a second client-side portion of the video game hosted by a second client computing system during execution of the server-side portion of the video game.

In some aspects, the techniques described herein relate to a computer-implemented method, wherein the client computing system continues to execute action events while the server computing system is executing the second set of action events.

In some aspects, the techniques described herein relate to a test system configured to test execution of a video game to validate the execution of video game code of the video game, wherein the video game includes a first portion corresponding to a first model and a second portion corresponding to a second model, the test system including: an electronic data store configured to store the second portion of the video game and the second model that corresponds to the second portion of the video game; and a hardware processor of an interactive computing system in communication with the electronic data store, the hardware processor configured to execute specific computer-executable instructions to at least: receive an action event log from a user computing system configured to execute the first portion of the video game, wherein the action event log includes an identity of a first set of action events triggered during execution of the first portion of the video game at the user computing system, wherein the first set of action events are performed with respect to the first model of the first portion of the video game, wherein the first set of action events cause a change in a state of the first model, and wherein the action event log further includes an identity of the state of the first model; execute a second set of action events corresponding to the first set of action events identified in the action event log, wherein the second set of action events are executed with respect to the second model within the second portion of the video game and corresponding to the first model, and wherein the second set of action events are executed independent of execution of the first set of action events; determine a state of the second model subsequent to execution of the second set of action events; compare the state of the second model to the state of the first model as identified in the action event log to obtain a comparison result; and execute a contextual action based at least in part on the comparison result.

In some aspects, the techniques described herein relate to a test system, wherein the second portion of the video game includes one of a plurality of second portions of the video game that interact with the first portion of the video game.

In some aspects, the techniques described herein relate to a test system, wherein the specific computer-executable instructions include isomorphic code configured to execute the second set of action events.

In some aspects, the techniques described herein relate to a test system, wherein, in response to determining that the comparison result indicates that the first model matches the second model, the hardware processor executes the contextual action to register an update to the state of the first model or the state of the second model.

In some aspects, the techniques described herein relate to a test system, wherein, in response to determining that the comparison result indicates that the first model does not match the second model, the hardware processor executes the contextual action to replace the first model with the second model at the user computing system.

In some aspects, the techniques described herein relate to a test system, wherein replacing the first model with the second model includes modifying a current state of the first model with the state of the second model.

In some aspects, the techniques described herein relate to a test system, wherein, in response to determining that the comparison result indicates that the first model does not match the second model, the hardware processor executes the contextual action to output an indication of a software bug in the video game code.

In some aspects, the techniques described herein relate to a test system, wherein, in response to determining that the comparison result indicates that the first model does not match the second model, the hardware processor executes the contextual action to output an indication of an occurrence of cheating during interaction with the first portion of the video game.

In some aspects, the techniques described herein relate to a test system, wherein the first set of action events include a series of action events performed over a first time period of interaction with the first portion of the video game.

In some aspects, the techniques described herein relate to a test system, wherein the second set of action events include the series of action events, and wherein the second set of action events are performed over a second time period that is a fraction of a length of the first time period.

In some aspects, the techniques described herein relate to a test system, wherein the interactive computing system interacts with a second instance of the first portion of the video game hosted by a second user computing system during execution of the second portion of the video game.

In some aspects, the techniques described herein relate to a test system, wherein the user computing system continues to execute action events while the hardware processor is executing the second set of action events.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be reused to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

DETAILED DESCRIPTION OF CERTAIN EMBODIMENTS

Figure 1:
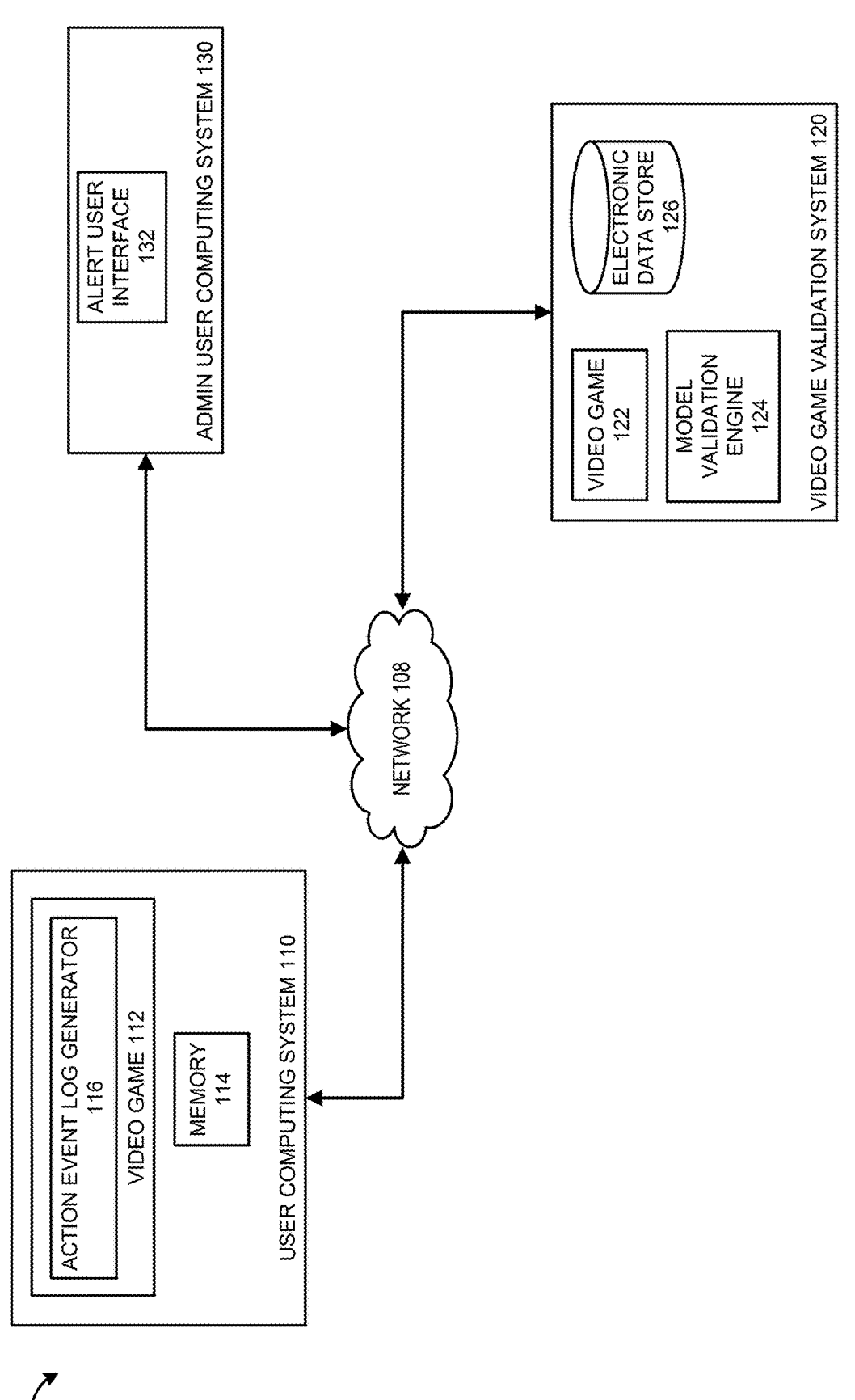
FIG. 1 illustrates aspects of a networked computing environment that can implement one or more aspects of a video game validation system in accordance with certain aspects of the present disclosure.

The headings provided herein, if any, are for convenience only and do not necessarily affect the scope or meaning of the claimed invention. For the purpose of the present disclosure, the terms mobile devices and wireless devices are used interchangeably.

INTRODUCTION

Performing tests of large applications, such as video games, can be time-consuming. Moreover, the number of different actions that can be performed and the randomness or pseudo randomness of both the user interactions and the execution of certain elements of some video games greatly increases the complexity of testing the video game. In some cases, there are hundreds, thousands, or more different combinations of interactions that may be performed with respect to just one situation or event within a video game. Further, each situation or event within the video game may be interrelated creating even more combinations of actions and states that potentially trigger an undesirable state due, for example, to a coding error. Additionally, testing a video game can interrupt the execution of the video game making performing the test much more time consuming than if a user were performing the same actions playing the video game independent of a testing process.

Certain video games are intended for a single user (e.g., one-player games). While in some cases it may be desirable to prevent cheating in single player games (e.g., games that ranks players or offer rewards or prizes from a shared pool), it is often not a concern. However, in multiplayer games, it is often undesirable to permit cheating as cheating can affect the enjoyment of other users who are playing the video game. Cheating may unbalance the playing field for users or make competition unfair. Regardless of the specific direct effect of cheating on the video game play or execution, cheating can cause a reduction or loss of retention of users. Thus, it is desirable to identify and prevent or reduce cheating by users playing a video game, particularly for multiplayer games or games that are played within or with respect to a shared game world.

Some users may cheat by using software to manipulate the video game. This software may play on behalf of a user enabling a user to quickly or easily obtain in-game resources without being present (e.g., when the user is sleeping or performing other activities). This software is sometimes referred to as a "bot" or a "robot." Other cheat software may enable the user to modify the video game (e.g., the video game source code or resources used by the video game) to provide an advantage, such as additional in-game resources or improved in-game statistics. Regardless of the type of cheating, in multiplayer games, cheating can impact the enjoyment of playing the games for other users. Using a robot to, for example, obtain an increased amount of an in-game resource while the user is sleeping, eating, or working can be referred to as "farming" (e.g., gold farming). Some users will then sell these "farmed" resources to other users, which can result in an unbalancing of the game. The cheating by some users can cause a loss of sales from disillusioned users. Thus, it is beneficial for a game developer or publisher to prevent or reduce the amount of cheating or other unauthorized interaction with the game.

Embodiments of the present disclosure enable the validation of execution of a video game to identify the existence of a coding error or of a user who is cheating when playing the video game. Systems and methods presented herein can record action events performed by an instance of a video game within an action event log, which may be provided to a validation system that can repeat the action events identified in the action event log. By comparing a state of the instance of the video game with a state generated by the validation system responsive to repeating the action events, the systems and methods presented herein can determine whether a coding error exists or if a user is cheating (e.g., using cheat software) when playing the video game. Further, systems and methods use isomorphic code enabling the validation system to repeat the action events independent of the system hosting the instance of the video game. Thus, the system hosting the instance of the video game may continue to operate and execute the video game while validation occurs.

To simplify discussion, embodiments are described herein with respect to a video game. However, the present disclosure is not limited as such, and embodiments herein may be applied to other types use cases. For example, embodiments disclosed herein may be applied to other types of applications including educational applications.

Example Networked Computing Environment

FIG. 1 illustrates aspects of a networked computing environment 100 that can implement one or more aspects of a video game validation system 120 in accordance with certain aspects of the present disclosure. The video game validation system 120 can include a model validation engine 124. The model validation engine 124 can validate a video game 112 hosted and/or executed by a user computing system 110.

The video game validation system 120 may further include or host a video game 122. The video game 122 may correspond to the video game 112. The video game 122 may be a copy or another instance of the video game 112. In some such cases, the video game 112 and the video game 122 may be configured to communicate with each other, or other instances of the video game, to enable certain interactions. This communication may use a peer-to-peer communication model, a client-server communication model, or any other type of communication model that enables multiple instances of a video game to interact. For example, the video game 112 and the video game 122 may be instances of a player-versus-player (PvP) fighting game that enables users to compete against each other in fighting matches.

Alternatively, the video game 112 and the video game 122 may each be separate parts of the same video game. In some such cases, multiple instances of the video game 112 may be capable of interacting with an instance of the video game 122. For example, the video game 122 may maintain a persistent universe and may execute, at least in part, continuously. In this example, the video game 112 interact with the persistent universe maintained by the video game 122 enabling a user to interact with the persistent universe and/or other users that interact with their own instances of the video game 112. For instance, for a massively multiplayer online role-playing game (MMORPG), the video game 122 may maintain the persistent universe of the MMORPG and the video game 112 may include video game code that enables a user to create an avatar and interact with the persistent universe maintained by the video game 122.

In yet other cases, the video game 122 may be a test version of the video game 112. In some such cases, the video game 122 may include additional or alternative features to the video game 112. Further, the video game 122 may include certain code that overlaps with the code or features of the video game 112 enabling the video game validation system 120 to test operation of the video game 112 based on an output of operations performed by the video game 122 in response to similar or identical stimuli (e.g., action events) that are provided to the video game 112.

Regardless of the relationship between the video game 112 and the video game 122, the video game 122 may include isomorphic code. Isomorphic code of the video game 122 may have a one-to-one mapping to code included in the video game 112 enabling action events performed at the video game 112 to be repeated at the video game 122. Isomorphic code may include code that can run on both front end and a backend, or on both a client and a server. In certain embodiments disclosed herein, isomorphic code is used with both the video game 112 and the video game 122 to enable one set of code to be used by both the video game 112 and the video game 122. Advantageously, by using one set of code or a universal code base, it is possible for the video game 122 to repeat operations performed by the video game 112 to determine whether a state of a model maintained by the video game 112 matches a state of a model generated by the video game 122 using the same operations executed by the video game 112. If an inconsistency in the model state of the model generated by the video game 122 when executing the same operations as executed by the video game 112 is identified, then it can be determined that a coding error exists or that a user is using cheat software to modify operation of the video game 112.

The video game 112 can include an action event log generator 116. The action event log generator 116 may track action events performed with respect to an object model or model maintained by the video game 112. The model may include an object within the video game 112 with behavior or actions that can be performed with respect to the object. In some cases, the video game 112 may implement a State-Action-Model (SAM) framework. In some such cases, objects generated by the video game 112 may be represented by a model that includes data and mutators that can validate changes to the data. A state function may be used to determine a state of the model based on the data included in the model. An action may realize a game event, such as a user input or an automated action that can change the data within the model.

The action event log generator 116 may generate a transaction receipt. This transaction receipt may also be an action event log that includes a log of action events performed with respect to a model. Further, the action event log may include a model state or a state of the model. This model state may include a state of the model before execution of the action event, a state of the model after execution of the action event, a change in a state of the model after execution of the action event, and/or a state of the model after execution of a plurality of action events.

As illustrated, the action event log generator 116 may be included as part of the video game 112. Alternatively, the action event log generator 116 may be a separate utility or system that can operate within the user computing system 110 and may monitor operation of the video game 112 to identify action events. In some cases, the action event log generator 116 may monitor memory space within a memory 114 that stores data associated with execution of the video game 112. Further, the memory 114 may be configured to store the action event log. Further, the memory 114 can store the video game 112.

The action event log generator 116 may transmit the action event log to the video game validation system 120. The video game validation system 120 may include the model validation engine 124. The model validation engine 124 may repeat actions identified in the action event log with respect to the video game 122. Further, the model validation engine 124 may compare a state of a model generated or maintained by the video game 122 to a state of a corresponding model included in the action event log. Based on the comparison, the model validation engine 124 can determine whether there are inconsistencies between the state of the model at the video game 112 and the state of the model at the video game 122 that may indicate whether a coding error exists and/or whether a user interacting with the video game 112 is using unauthorized software (e.g., cheat software) when interacting with the video game 112.

The model validation engine 124 can generate an alert and/or cause the admin user computing system 130 to generate an alert to inform a user, such as an administrator or a tester, regarding an inconsistency between the model state at the video game 112 and the model state at the video game 122. Further, the model validation engine 124 can generate an alert or cause the admin user computing system 130 to generate an alert indicating the existence of a coding error and/or the use of cheat software.

The admin user computing system 130 can include any computing system that can output an alert to a user. In some cases, the alert may be an audible alert, a visual alert, an email, a text message, or any other type of alert that may indicate the existence of a coding error or use of cheat software with respect to the video game 112. The admin user computing system 130 may include an alert user interface 132 that can present the alert to a user, such as an administrator or a video game tester. In some embodiments, the admin user computing system 130 is a separate computing system that can interact with the video game validation system 120 directly or via the network 108. In other embodiments, the admin user computing system 130 or the functionality thereof may be implemented by the video game validation system 120.

The video game validation system 120 may further include an electronic data store 126 that can store non-volatile computer executable instructions for implementing the operations associated with the model validation engine 124. Further, the electronic data store 126 can store the video game 122 and/or the action event log.

The user computing system 110 may include hardware and software components for establishing communications over a network 108. For example, the user computing system 110 may be equipped with networking equipment and network software applications (for example, browser software) that facilitates communication via a network (for example, the Internet) or an intranet. The user computing system 110 may include varied local computing resources, such as central processing units and architectures, memory, mass storage, graphics processing units, communication network availability and bandwidth, and so forth. Further, the user computing system 110 may include any type of computing system that can host or execute a video game 112. For example, the user computing system 110 may include any type of computing device(s), such as desktops, laptops, severs, video game platforms or consoles, television set-top boxes, televisions (for example, Internet TVs), network-enabled kiosks, car-console devices, computerized appliances, wearable devices (for example, smart watches or smart glasses with computing functionality), and wireless mobile devices (for example, smart phones, PDAs, tablets, or the like), to name a few. In some embodiments, the user computing system 110 may include one or more of the embodiments described below with respect to FIG. 4.

The video game validation system 120 and the admin user computing system 130 may include one or more of the embodiments described with respect to the user computing system 110. For example, the video game validation system 120 and/or the admin user computing system 130 may be implemented as a desktop computing system, a server, a video game platform, and the like. Further, the video game validation system 120 and/or the admin user computing system 130 may include a central processing unit, memory, non-volatile storage, and the like.

In some embodiments, the video game validation system 120 may be or may be hosted by a server computing system configured to host a sever portion of a video game. For example, in cases where the video game is a multiplayer video game that includes a persistent world (e.g., an MMORPG), the video game 112 may be a client portion of the video game, the video game 122 may be a server portion of the video game, and the video game validation system 120 may be a host computing system that can host the server portion of the video game (e.g., the video game 122).

The network 108 can include any type of communications network. For example, the network 108 can include one or more of a wide area network (WAN), a local area network (LAN), a cellular network, an ad hoc network, a satellite network, a wired network, a wireless network, and so forth. Further, in some cases, the network 108 can be or can include the Internet.

Example Timing Diagram

Advantageously, the model validation engine 124 can perform asynchronous validation of the video game 112. The tracking of action events over time and the use of isomorphic code enables validation of execution of the video game 112 to be performed independently of execution of the video game 112 enabling the validation to be performed at a later time period while permitting the video game 112 to continue executing.

Figure 2:
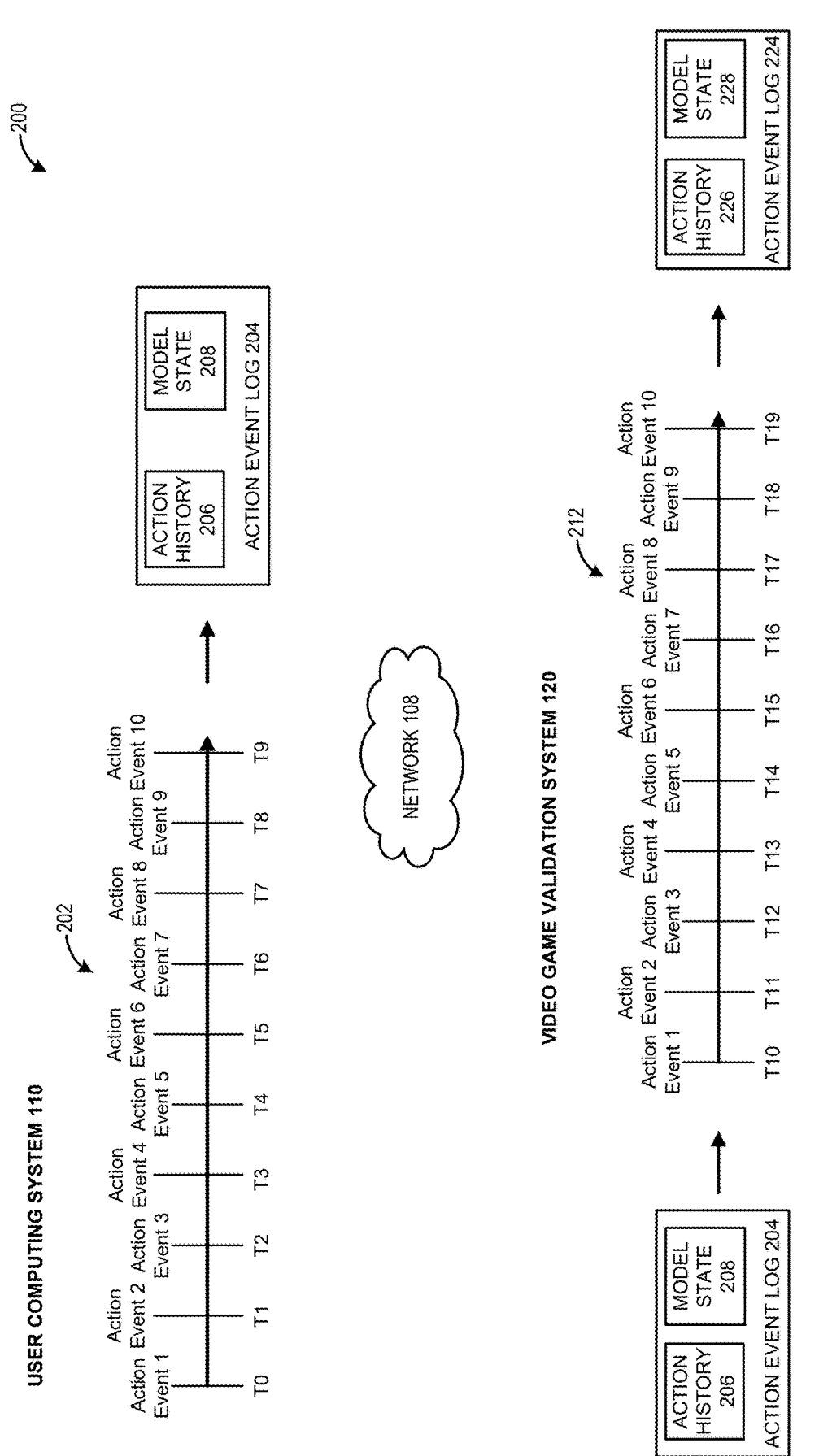
FIG. 2 illustrates an example timing diagram of an action event log based video game validation system in accordance with certain aspects of the present disclosure.

FIG. 2 illustrates an example timing diagram 200 of an action event log based video game validation system in accordance with certain aspects of the present disclosure. The timing diagram 200 includes a first timing diagram 202 that illustrates the execution of a set of action events over a time period beginning at time T0 (Action Event 1) and extending to time T9 (Action Event 10). Although not illustrated, additional action events may be performed beyond time T9 with respect to the video game 112 hosted by the user computing system 110.

The action event log generator 116 may generate an action event log 204 (or transaction receipt) that includes a history of the action events performed by the video game 112. The action event log 204 may include an action history 206 that includes the history of the action events performed by the video game 112 and a model state 208 that includes a state of the model being monitored by the action event log generator 116. The action history 206 may identify the action events performed while executing the video game 112 in any manner that can be used by the video game validation system 120 to determine the action event and/or to identify a corresponding action event that can be performed at the video game 122. For example, the action history 206 may identify the action events by class name, method name, action type, corresponding action (e.g., cause avatar to run or jump, etc.) within the video game 112, and the like.

In some cases, the model state 208 may include multiple model states associated with the model and/or associated with multiple models. For example, the model state 208 may include a model state corresponding to a state of the model after each executed action event. As another example, the model state 208 may include a model state for each object model that is modified by the action event and/or that is referenced by the action event. In yet another example, the model state 208 may include a model state for each object model included in the video game 112. The model state 208 may include variable data or any other information that enables the video game validation system 120 to determine a state of a model in the video game 112.

The action event log 204 may be transmitted by the user computing system 110 to the video game validation system 120. The action event log 204 may be transmitted via the network 108. The video game validation system 120 may supply the action event log 204 to the model validation engine 124, which can access the action history 206 to determine actions performed by the video game 112. The model validation engine 124 may perform the same or corresponding action events at the video game 122 as illustrated by the second timing diagram 212.

In the illustrated embodiment, and as can be seen by comparing the first timing diagram 202 and the second timing diagram 212, the model validation engine 124 causes the video game 122 to execute the same action events as the video game 112 executed. However, as can also be seen by comparing the first timing diagram 202 and the second timing diagram 212, the action events performed at the video game validation system 120 are executed at some time period after the action events executed at the user computing system 110. In other words, time T10 occurs at some time after time T9. Moreover, Action Event 1 executed at time T10 is not only performed at some time after time T0 corresponding to when the Action Event 1 is executed at the user computing system 110, but it is performed at a time after Action Events 2-10 are executed at the user computing system 110. Thus, it can be seen that in certain embodiments, the video game 112 may continue to execute without awaiting validation of action events by the video game validation system 120. Advantageously, this asynchronous validation enables the video game 112 to operate uninterrupted while validation is performed. Further, computing resources can be reduced or distributed because validation can be scheduled at a time of reduced usage of the video game validation system 120 and/or of a server portion of the video game 112 (e.g., the video game 122).

In some embodiments, the time period defined by T10 to T19 may be the same as the time period defined by T0-T9. However, in other embodiments, the time period defined by T10 to T19 may be shorter than (e.g., a fraction of the time period length) the time period defined by T0 to T9. For example, the Action Events 1-10 performed by the user computing system 110 may occur over time as a user interacts with the video game 112. In contrast, in some cases, the Action Events 1-10 performed by the video game validation system 120 may simulate interaction with the video game 122 and may therefore be performed in significantly less time. Thus, in some embodiments, testing or repeating actions performed by a user interacting with the video game 112 can take less time than the user's interaction with the video game 112.

In some cases, the video game 122 may also include an action event log generator (not shown). This action event log generator included in the video game 122 of the video game validation system 120 may generate an action event log 224. As with the action event log 204, the action event log 224 may include an action history 226 and a model state 228. The action history 226 will typically match the action history 206 because the video game validation system 120 performs the actions identified in the action history 206 with respect to the video game 122. However, in some cases, the action history 226 may differ from the action event log 204. For example, a software bug or cheating may cause different outputs that may affect subsequent action events and consequently the action history 226.

The model state 228 will generally match the model state 208 assuming that there are no software bugs in the video game 112 and/or that there has not been an occurrence of cheating. However, in some cases, there may be some variation between the model state 228 and the model state 208. In cases where there is variation, this variation will often be less than a threshold variation. This expected or less than threshold degree of variation may be due to randomness or pseudo randomness within the video game. In cases where there is a software bug or an occurrence of cheating, the model state 228 will differ from the model state 208, or differ by more than the threshold degree of variation. Thus, in some cases, the video game validation system 120 can compare the model state 228 with the model state 208 to determine whether there has been an occurrence of heating or the existence of a software bug.

Example Video Game Execution Validation Process

Figure 3:
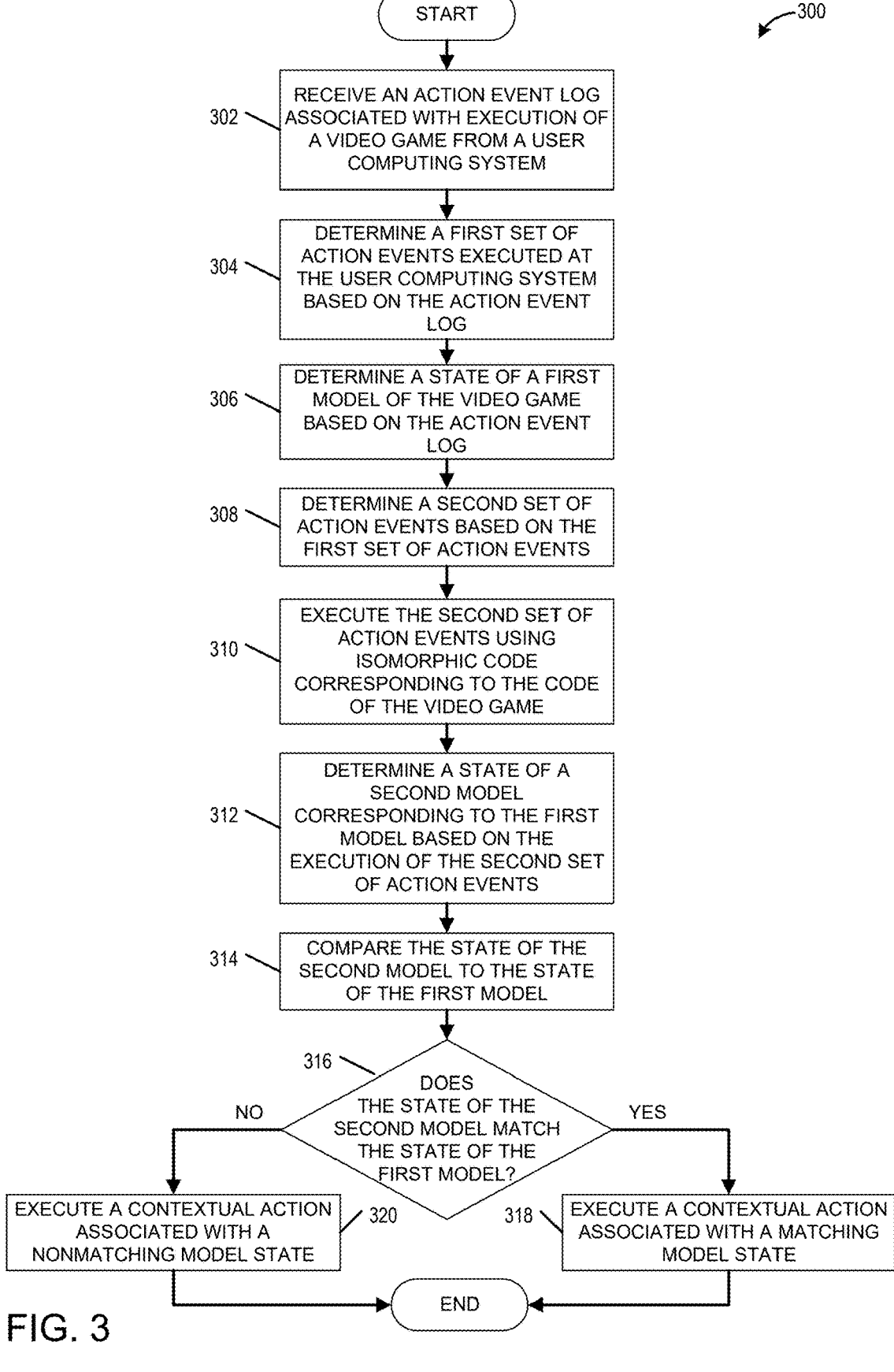
FIG. 3 presents a flowchart of an example video game execution validation process in accordance with certain aspects of the present disclosure.

FIG. 3 presents a flowchart of an example video game execution validation process 300 in accordance with certain aspects of the present disclosure. The process 300 may be a computer-implemented method or process that can be performed by one or more hardware processors. The process 300 can be implemented by any system that can replicate a series of actions performed at a user computing system 110 with respect to a video game 112 using isomorphic code to determine whether a state of the video game 112 can be replicated and/or to determine whether the video game 112 has a coding error or whether cheating is occurring. The process 300, in whole or in part, can be implemented by, for example, the user computing system 110, the video game 112, the action event log generator 116, the video game validation system 120, the model validation engine 124, the video game 122, the admin user computing system 130, or the alert user interface 132, among others. Although any number of systems, in whole or in part, can implement the process 300, to simplify discussion the process 300 will be described with respect to particular systems.

The process 300 can be performed continuously, on a scheduled basis, or in response to a trigger. The trigger can include any type of trigger that can cause the process 300 to be initiated. For example, the trigger can be a user command, a script command, a passage of time, an execution of a threshold number of action events, and the like.

The process 300 begins at block 302 where the video game validation system 120, for example, receives an action event log 204 (also referred to as a transaction receipt) associated with execution of the video game 112, or an instance thereof, from a user computing system 110. This user computing system 110 may be a client computing system configured to execute a client-side portion of the video game 112. As previously described, the action event log 204 can include an action history 206 that includes an identity of a set of action events triggered during execution of the video game 112, which may comprise an entirety of a video game or which may be a client-side portion of a video game that executes at least partially in conjunction with a server-side portion of a video game (e.g., the video game 122).

At block 304, the model validation engine 124 determines a first set of action events executed at the user computing system 110 (e.g., by the video game 112) based at least in part on the action event log 204. Determining the first set of action events may include accessing the action history 206 of the action event log 204. The first set of action events may be identified based on action event identifiers included in the action history 206. The first set of action events may include one or more action events. Further, the first set of action events is not limited in number. Further, identifying the first set of action events may include identifying one or more models or objects upon which the action events were performed at the video game 112. These models or objects may include any type of model that may be included in the video game 112. For example, the models may correspond to playable characters or avatars, non-playable characters (NPCs), objects with which a user may interact within the video game 112 (e.g., a weapon, a ball, a tool, etc.), environment features (e.g., buildings, mountains, trees, blocks, etc.) within the video game 112, or any other object that may have state within the video game 112.

At block 306, the model validation engine 124 determines a state of a first model of the video game 112 based at least in part on the action event log 204. The state of the first model may be obtained from the action event log 204. As indicated above, the action event log 204 may include the identity of action events performed with respect to multiple models. For example, the action event log 204 may include identities of multiple sets of action events with each set of action events performed with respect to different models at the video game 112. In such cases, the action event log 204 may include model state 208 for each of the models for which action events are identified. In some cases, an action event may affect a model state for multiple models. In some such cases, the action event log 204 may include model state 208 for each model affected by the action event.

Moreover, in some cases, an action event may be intended to affect one or more models and/or to not affect one or more models of the video game 112. In some such cases, the action event log 204 may include a state for one or more models included in the video game 112 whether or not each of the one or more models is affected, directly or indirectly, by performance of an action event. For example, an action event that causes an in-game character to shoot an arrow at a monster may modify a state of a model associated with the arrow (e.g., the arrow object is removed from the game), a state of a model associated with the monster (e.g., the monster state is changed from live to dead), a state of a model associated with the in-game character (e.g., an experience level of the game character increases), etc. Thus, the execution of the one action event may impact multiple model states. Moreover, in some cases, the same action event may not impact a state of a model. For instance, if the monster is immune to physical damage, the action event of firing the arrow may not modify the state of the model associated with the monster.

At block 308, the model validation engine 124 determines a second set of action events based at least in part on the first set of action events determined at the block 304. In some cases, the second set of action events are the same as the first set of action events. Thus, in some such cases, the block 308 may be optional or omitted and the identity of the first set of action events may be used to perform the remainder of the process 300. Determining the second set of action events may include identifying action events to execute or trigger at the video game 122 that perform similar or the same actions as the first set of action events.

At block 310, the model validation engine 124 executes the second set of action events at the video game 122. Executing the second set of action events may include causing isomorphic code of the video game 122 corresponding to the code of the video game 112 to perform the second set of action events. Further, executing the second set of action events may include executing the second set of action events with respect to one or more models of the video game 122 that correspond to models of the video game 112 for which the first set of action events were executed.

As illustrated in FIG. 2, the second set of action events (e.g., the Action Events 1-10 associated with times T10-T19) may be executed at some time subsequent to the first set of action events (e.g., the Action Events 1-10 associated with time T0-T9). In some cases, the second set of action events are executed at least a minimum time after execution of the first set of action events. In some cases, the second set of action events are executed a fixed time period after the first set of action events. In other cases, the time period between when the first set of action events are executed and when the second set of action events are executed is not fixed. Advantageously, the timing of execution of the second set of action events may be scheduled based on usage of network bandwidth and/or computing resources. For example, the second set of action events may be executed at a time of low resource use or high bandwidth availability to minimize the impact of the testing and/or cheat detection on other tasks, such as execution of a server-side portion of the video game 112 or other computing tasks. In some cases, each action event executed by the user computing system 110 may be identified to the video game validation system 120 and a corresponding action event may be executed by the video game validation system 120 prior to execution of a subsequent action event by the user computing system 110 to validate accurate performance of the action event. However, as already explained herein, generally a plurality of action events are executed by the user computing system 110 with corresponding action events being executed by the video game validation system 120 at some at least minimum subsequent time period thereby reducing or preventing interruption of the execution of the video game 112 while performing cheat detection or code error detection.

At block 312, the model validation engine 124 determines a state of a second model corresponding to the first model based at least in part on the execution of the second set of action events. Determining the state of the second model may include determining values for one or more variable of the second model. In some cases, the block 312 may include determining the state of a plurality of models at the video game 122 that correspond to a plurality of models at the video game 112 identified in or whose state is included in the action event log 204.

At block 314, the model validation engine 124 compares the state of the second model to the state of the first model. Comparing the state of the second model with the state of the first model may include comparing state values or values of variables included in each of the models. In some cases, comparing the set of the second model with the state of the first model may include determining whether a value of a variable of the second model is within a threshold range of a value of a corresponding variable in the first model.

At decision block 316, the model validation engine 124 determines whether the state of the second model matches the state of the first model. Determining whether the state of the second model matched the state of the first model may include determining, based on the comparison at the block 314, whether one or more variable values included in or defined by the second model matches one or more values of corresponding variables of the first model. In some cases, the decision block 316 may include determining whether a value of a variable of the second model differs from a value of a variable of the first model by less than a threshold.

In certain embodiments, identically executed code may result in different outputs. For example, some video games use randomization or pseudo randomization that changes game play each time the video game is played. In some cases, the video game may modify values of certain variables based on a seed value. This seed value may be associated with a passage of time or affected by a characteristic of a computing system hosting the game. This characteristic may be something unique, such as a serial number. Accordingly, identical in-game action events may produce non-identical outputs. Often, even when the outputs of repeated action events are non-identical, they will be within a particular range. For example, an opened treasure chest may provide a particular number of items (e.g., arrows, magic bolts, etc.) that is within a particular range. Advantageously, treating a less than threshold difference as a match reduces false positives when determining an existence of coding errors or cheat software usage.

In response to determining that the state of the second model matches the state of the first model at the decision block 316, the process 300 proceeds to block 318 where the model validation engine 124 executes a contextual action associated with a matching model state. The contextual action can include any type of action that may be performed in response to determining that the state of the second model matches the state of the first model. For example, the contextual action may include logging a successful test of the video game 112. As another example, the contextual action may include registering or committing an update to the state of the first model. Committing the update to the state of the first model may include maintaining a store of the first model and/or the second model with respect to the video game 112 and/or the video game 122. In some cases, the contextual action may include taking no action.

In response to determining that the state of the second model does not match the state of the first model at the decision block 316, the process 300 proceeds to block 320 where the model validation engine 124 executes a contextual action associated with a nonmatching model state. In certain embodiments, a determination that the state of the second model does not match the state of the first model may indicate that the video game 112 includes a coding error. Alternatively, or in addition, a determination that the state of the second model does not match the state of the first model may indicate that a user of the video game 112 is cheating, such as by modifying the video game 112 or by using cheat software to interact with the video game 112.

The contextual action of the decision block 316 can include any type of action that can be performed in response to determining that the state of the second model does not match the state of the first model. For example, the contextual action may include the video game validation system 120 generating an alert. In some cases, the video game validation system 120 may cause the alert user interface 132 to generate the alert. This alert may indicate that a user is cheating. In some cases, the alert may include any metadata that may facilitate determining how the user is cheating (e.g., using cheat software, making an unauthorized modification to the video game 112, a resource, or a library, or any other type of cheating). For example, the alert may identify the action event that triggered the contextual action, one or more action events that occurred prior to the determination of the mismatch between model states, the particular state mismatch that triggered the contextual action, the model that is associated with triggering the contextual action, and the like. The alert may be an audio alert, a visual alert, or a combination thereof. In some cases, the alert may be a message such as a pop-up message, an email, a text message, a message within any type of communication software, and the like. Advantageously, by identifying that a user is cheating, action can be taken to address the cheating. This action may include warning the user, removing the user from the video game 112 or video game 122, modifying the video game 112 or the video game 122 to remove the benefits achieved by cheating or to punish the user for cheating, or any other responsive action.

In some embodiments, the alert may indicate that the video game 112 includes a coding error or software bug. In some such cases, the alert may include any information that can facilitate identifying the location or type of coding error. For example, the alert may include an identify of the model associated with the error, the action event that triggered the error, one or more action events that occurred prior to the error, an action event that occurred after the error, a state of other models within the video game 112, and the like. Further, the alert may include some or all of the information indicated above that may be included for an alert indicating an occurrence of cheating. In some cases, the alert may be a fail message that indicates execution of the video game 112 or video game 122 has failed due, for example, to the software bug or impermissible actions (e.g., cheating) by the user or player.

In some cases, the contextual action may include replacing the first model at the video game 112 with the second model. Alternatively, or in addition, the contextual action may include replacing a current model corresponding to the first model at the video game 112 with the second model. For example, the first model may no longer exist because the video game 112 may have continued executing after sending the action event log to the video game validation system 120 at the block 302. Thus, the first model may no longer exist. In some cases, the contextual action may include reverting a state of the video game 112 to a state that corresponds to a state of the video game 122 after performance of the second set of action events.

Advantageously, by replacing the first model with the second model, a state of a model achieved by cheating or using cheat software may be reverted to a state of the model that would be achieved absent the occurrence of cheating. Replacing the state of the first model with the state of the second model may include modifying one or more variables included in the first model to match the value of the corresponding variables included in the second model. In other cases, the contextual action may include replacing the first model with another model. For example, the first model may be replaced with a model that has a state that is less desirable than a state that would have been achieved without cheating (e.g., punishing the user for cheating).

Example User Computing System

Figure 4:
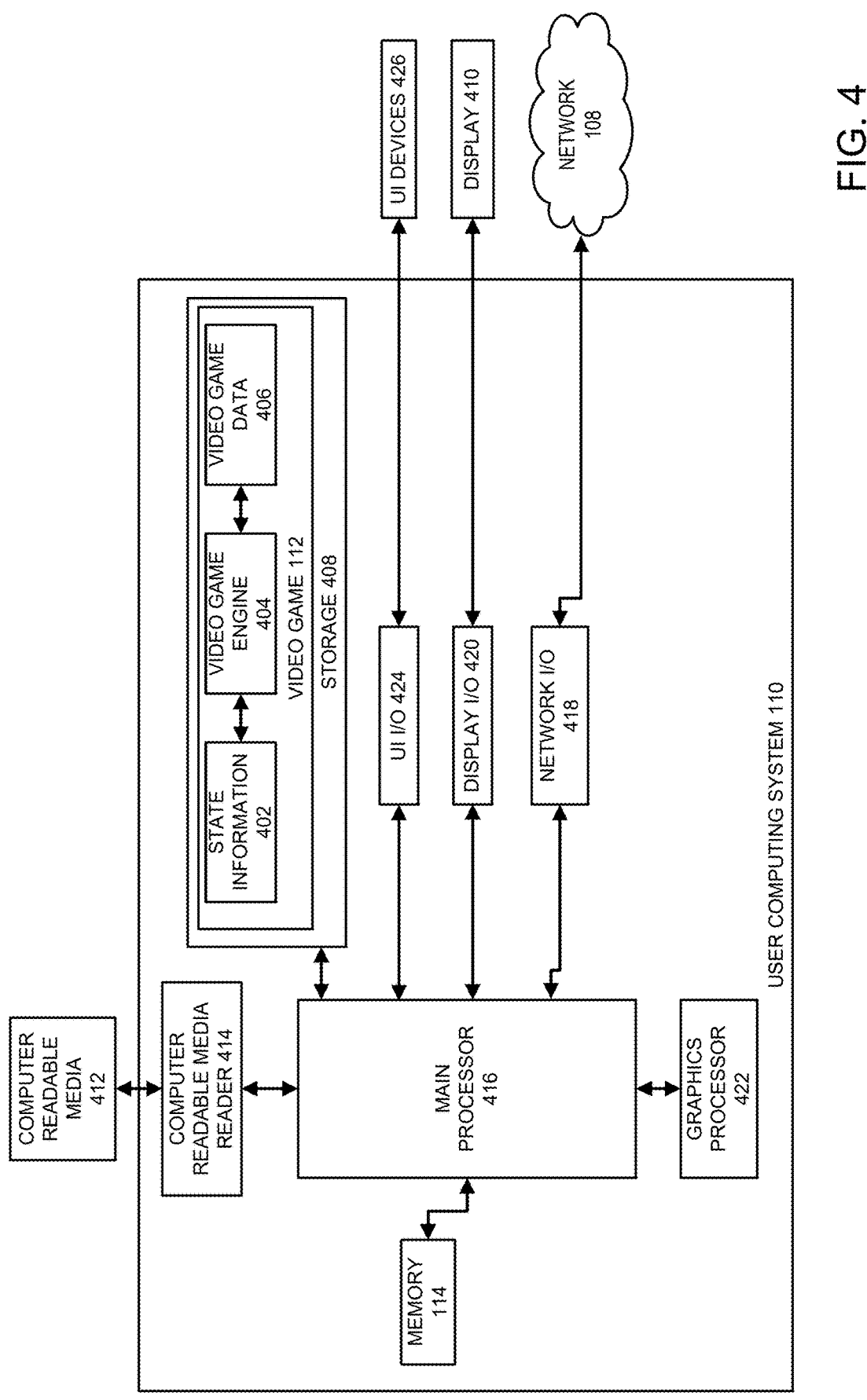
FIG. 4 illustrates an embodiment of a hardware configuration for the user computing system of FIG. 1 in accordance with certain aspects of the present disclosure.

FIG. 4 illustrates an embodiment of a hardware configuration for the user computing system 110 of FIG. 1 in accordance with certain aspects of the present disclosure. In some embodiments, the video game validation system 120 and/or the admin user computing system 130 may include one or more of the systems described with respect to the user computing system 110.

The user computing system 110 can include any type of computing system that can execute a video game 112 including, but not limited to a special purpose game console, a general purpose computing system, a smart phone, a portable computing system, a smart television, a smart watch, etc. The video game 112 may include any type of video game application that can be executed on a computing system (such as the user computing system 110). The video game 112 may include any type of gaming application that may have a variable execution state based at least in part on the preferences or capabilities of a user. In some cases, the video game 112 may include other applications that may not be considered games by some users, such as educational software.

The video game 112 may include software code that a user computing system 110 can use to provide an interactive game for a user to play. The video game 112 may include software code that informs a user computing system 110 of processor instructions to execute. The video game 112 may further include data or resources used in the playing of the game, such as data relating to constants, images, and other data structures. For example, in the illustrated embodiment, the video game 112 includes state information 402, a video game engine 404, and video game data 406.

The video game engine 404 can be configured to execute aspects of the video game 112 within the user computing system 110. Executing the video game 112 can be based, at least in part, on the user input received, the video game data 406, and state information 402. The video game data 406 can include game rules, prerecorded motion capture poses/paths, environmental settings, constraints, animation reference curves, skeleton models, and/or other game application information. Further, video game data 406 may include information that is used to set or adjust the configuration of the video game 112 including difficulty or operating mode (e.g., single player vs multiplayer).

The video game engine 404 can execute gameplay within the video game 112 according to game rules. Some examples of game rules can include rules for winning, for scoring, responding to inputs, and the like. Further, game rules may include definitions of actions/events including types of movements in response to inputs, and the like. Other components can control what inputs are accepted, how the video game progresses, and other aspects of gameplay. During execution of the video game 112, state information 402 may be generated or stored. This state information may include the state of any objects or models within the video game 112. For example, the state information may include character states, environment states, scene object storage, and/or other information associated with a state of execution of the video game 112. The state information 402 may specify the state of the video game 112 at a specific point in time and may include anything that can be used to determine game state, such as a character position, character action, game level attributes, and other information contributing to a state of the video game 112.

The video game 112 can receive the user inputs and determine in-game events, such as actions, collisions, runs, throws, attacks, and other events appropriate for the type of video game 112. During operation, the video game engine 404 can read in video game data 406 and state information 402 to determine the appropriate in-game events based on the rules defined as part of the video game engine 404. In one non-limiting example, the video game engine 404 can determine action events associated with an in-game character. These action events can be conveyed to a movement engine that can determine the motions the in-game character should make in response to the action events. The movement engine may provide the identity of the motions to an animation engine. The animation engine can determine new poses for the in-game character and provide the new poses to a skinning and rendering engine. The skinning and rendering engine, in turn, can provide the character image to an object combiner to combine animate, inanimate, and background objects into a full scene. The full scene can be conveyed to a rendering engine, which can generate a new frame for output on a display 410. The process can be repeated for rendering each frame during execution of the video game 112. Though the process has been described in the context of a character, the process can be applied to any process for processing events and rendering the output for display to a user.

The video game 112 can be stored within the storage 408 of the user computing system 110. The storage 408 can include any type of non-volatile storage, such as a hard disk drive, a flash driver, and the like. Alternatively, or in addition, the video game 112 can be stored on a computer readable media 412. The computer readable media 412 can be any type of non-volatile computer readable media, such as a CD-ROM, a DVD, flash drive, USB drive, and the like. The computer readable media 412 may include portable or external media that can be accessed to read by a computer readable media reader 414 of the user computing system 110. The computer readable media reader 414 can include any type of device that can read the computer readable media 412. For example, the computer readable media reader 414 can be an optical media reader, such as a CD or DVD drive, a USB drive reader, a flash drive reader, and the like. Moreover, the computer readable media reader 414 may include a port capable of interfacing the computer readable media 412, such as a USB port.

In some embodiments, the computer readable media reader 414 may be optional or omitted. For example, in some cases, the user computing system 110 may access applications or game content (e.g., the video game 112) over the network 108 via a network interface 418. The network interface 418 may be a network input/output (I/O) device, such as a radio frequency (RF) network card, and ethernet card, and the like. In cases where the video game 112 is accessed via the network 108, the computer readable media 412 may be optional or omitted.

The user computing system 110 may include a main processor 416. The main processor 416 is a hardware processor that may be implemented by one or more single or multicore central processing units. The main processor 416 may interact with other components of the user computing system 110 either directly or indirectly. In some cases, the main processor 416 may communicate with components via memory 114 and/or via a communication bus (not shown). Further, the main processor 416 may communicate with internal and/or external components.

In some embodiments, the main processor 416 may include an integrated graphics card capable of performing graphics processing and outputting images to the display 410 via a display interface 420. In other embodiments, the user computing system 110 may include a graphics processor 422, which may be implemented on a separate or discrete graphics card. In some other cases as indicated above, the graphics processor 422 may be built into the main processor 416, such as with an APU. In some such cases, the graphics processor 422 may share Random Access Memory (RAM) with the main processor 416. Alternatively, the graphics processor 422 may have separate RAM (e.g., video RAM) from the main processor 416. Further, in some cases, the graphics processor 422 may operate in conjunction with one or more additional graphics processors and/or with an embedded or non-discrete graphics processing unit, which may be embedded into a motherboard and which is sometimes referred to as an on-board graphics chip or device.

The user computing system 110 can also include various components for enabling interaction with the user computing system 110 (e.g., input/output or I/O components). These I/O components can include, for example, the network interface 418, the display interface 420, and user interface components 424. The user interface components 424 can include any type of user interface components that can interact with any type of user interface devices 426. For example, the user interface components 424 may include one or more controllers (e.g., USB controllers, game pad interface controllers, serial interface controllers, etc.) and/or one or more ports (e.g., USB ports, serial interface ports, game pad controller ports, etc.). Further, the user interface devices 426 can include any type of user interface devices including gamepads, keyboards, mice, digital pens, virtual reality goggles, motion capture devices, and the like. In some cases, the user interface components 424 and/or the user interface devices 426 may include touch-enabled devices (e.g., touchpads, touchscreens, etc.). In some cases, the display interface 420 and the user interface components 424 may be combined and/or overlap in functionality. For example, a touchscreen may include both display functionality and user input functionality that may be controlled by one or more of the display interface 420 and the user interface components 424.

The various I/O elements (e.g., the network interface 418 the display interface 420, or the user interface components 424) can interact with storage 408, either directly or via other internal systems (e.g., a communication bus or the main processor 416). Further, the main processor 416 can communicate through one or more I/O elements to store data, such as state information 402 or any shared data files. In addition to storage 408 and removable storage media (e.g., computer readable media 412), the user computing system 110 may include memory 114, which can include ROM (Read-Only Memory) and/or Random Access Memory (RAM). In some cases, the memory 114 may be used for data that is accessed frequently, such as when the video game 112 is being executed or played.

The user interface components 424 may be used to send and receive commands between the main processor 416 and one or more user interface devices 426, such as game controllers. In some embodiments, the user interface components 424 can be configured to receive touchscreen inputs. The touchscreen can be a capacitive touchscreen, a resistive touchscreen, or other type of touchscreen technology that is configured to receive user input through tactile inputs from the user. The display interface 420 can provide input/output functions that are used to display images from the video game 112 on a display 410. The network interface 418 may be used for input/output functions via a network 108. The network interface 418 may be used during execution of a video game, such as when the video game 112 is being played online or being accessed online.

The display interface 420 may generate display output signals, which may include signals for displaying visual content produced by the user computing system 110 on a display 410. This visual content may include graphics, user interfaces, video, and/or other visual content. The user computing system 110 may comprise one or more integrated displays configured to receive display output signals produced by the display interface 420, which may be output for display to a user. According to some embodiments, display output signals produced by the display interface 420 may be output to one or more external display 410 that communicate directly or indirectly with the user computing system 110.

Software or program code can be stored in the storage 408 and/or the memory 114 (which might comprise hard disk, other magnetic storage, optical storage, solid state drives, and/or other non-volatile storage, or a combination or variation of these). At least part of the software code can be stored in ROM that is programmable (ROM, PROM, EPROM, EEPROM, and so forth), in storage 408, and/or on removable media such as the computer readable media 412 (which can be a CD-ROM, cartridge, memory chip or the like, or obtained over a network 108 or other electronic channel as needed). In general, program code can be found embodied in a tangible non-transitory signal-bearing medium.

The memory 114 may include random access memory (RAM), cache, or other types of storage that may be usable to store variables and other game and processor data as needed. The memory 114 may be used to, at least tempo-rarily, store data that is generated during the execution of the video game 112 and portions thereof might also be reserved for frame buffers, state information 402 and/or other data needed or usable for interpreting user input and generating game displays. Generally, memory 114 is volatile storage and data stored within memory 114 may be lost when the user computing system 110 is turned off or loses power. However, in some cases, the memory 114 may also include non-volatile memory.

As the user computing system 110 reads or accesses computer readable media 412 to obtain access to a video game, information (e.g., software code or data) may be read from the computer readable media 412 and stored in a memory device, such as the memory 114. Additionally, data from storage 408 and/or servers accessed via network 108, or removable storage media 46 may be read and loaded into the memory 114. Although data is described as being found in the memory 114, it will be understood that data does not have to be stored in the memory 114 and may be stored in other memory accessible to the main processor 416 or distributed among several media, such as the computer readable media 412 and the storage 408.

The user computing system 110 illustrated in FIG. 4 is one non-limiting example of a computing system. In some cases, the user computing system 110 may include additional or alternative components, such as a communications bus, a clock, cache memory, flash memory, a BIOS chipset, and the like. Further, the user computing system 110 may include an audio/video player that can be used to play a video sequence, such as a movie.

Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other com-puter storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out alto-gether (for example, not all described acts or events are necessary for the practice of the algorithms). Moreover, in certain embodiments, acts or events can be performed con-currently, for example, through multi-threaded processing, interrupt processing, or multiple processors or processor cores or on other parallel architectures, rather than sequen-tially. In addition, different tasks or processes can be per-formed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other program-mable logic device, discrete gate or transistor logic, discrete hardware components, or any combination thereof designed to perform the functions described herein. A processor can be a microprocessor, but in the alternative, the processor can be a controller, microcontroller, or state machine, combina-tions of the same, or the like. A processor can include electrical circuitry configured to process computer-execut-able instructions. In another embodiment, a processor includes an FPGA or other programmable device that per-forms logic operations without processing computer-execut-able instructions. A processor can also be implemented as a combination of computing devices, for example, a combi-nation of a DSP and a microprocessor, a plurality of micro-processors, one or more microprocessors in conjunction with a DSP core, or any other such configuration. Although described herein primarily with respect to digital technol-ogy, a processor may also include primarily analog compo-nents. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the dis-closed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A computer-implemented method of validating execution of video game code of a video game, the computer-implemented method comprising:

by a server computing system comprising one or more hardware processors and configured to execute a server-side portion of the video game, receiving an action event log from a client computing system configured to execute a client-side portion of the video game, wherein the action event log comprises an identity of a first set of action events triggered during execution of the client-side portion of the video game at the client computing system, wherein the first set of action events are performed with respect to a first model within the client-side portion of the video game and cause a change in a state of the first model, and wherein the action event log further comprises an identity of the state of the first model;

executing a second set of action events corresponding to the first set of action events identified in the action event log, wherein the second set of action events are executed with respect to a second model within the server-side portion of the video game and corresponding to the first model, and wherein the second set of action events are executed at least a minimum time period subsequent to execution of the first set of action events with respect to the first model;

determining a state of the second model subsequent to execution of the second set of action events;

comparing the state of the second model to the state of the first model as identified in the action event log to obtain a comparison result; and executing a contextual action based at least in part on the comparison result.

2. The computer-implemented method of claim 1, wherein the second set of action events are executed by isomorphic code of the server-side portion of the video game.

3. The computer-implemented method of claim 1, wherein, in response to determining that the comparison result indicates that the first model matches the second model, executing the contextual action comprises registering an update to the state of the first model or the state of the second model.

4. The computer-implemented method of claim 1, wherein, in response to determining that the comparison result indicates that the first model does not match the second model, executing the contextual action comprises replacing the first model with the second model at the client computing system.

5. The computer-implemented method of claim 4, wherein replacing the first model with the second model comprises modifying a current state of the first model with the state of the second model.

6. The computer-implemented method of claim 1, wherein, in response to determining that the comparison result indicates that the first model does not match the second model, executing the contextual action comprises outputting an indication of a software bug in the video game code of the video game.

7. The computer-implemented method of claim 1, wherein, in response to determining that the comparison result indicates that the first model does not match the second model, executing the contextual action comprises outputting an indication of an occurrence of cheating by a user interacting with the client-side portion of the video game.

8. The computer-implemented method of claim 1, wherein the first set of action events comprise a series of action events performed over a first time period of interaction with the client-side portion of the video game.

9. The computer-implemented method of claim 8, wherein the second set of action events comprise the series of action events, and wherein the second set of action events are performed over a second time period that is a fraction of a length of the first time period.

10. The computer-implemented method of claim 1, wherein the server computing system interacts with a second client-side portion of the video game hosted by a second client computing system during execution of the server-side portion of the video game.

11. The computer-implemented method of claim 1, wherein the client computing system continues to execute action events while the server computing system is executing the second set of action events.

12. A test system configured to test execution of a video game to validate the execution of video game code of the video game, wherein the video game comprises a first portion corresponding to a first model and a second portion corresponding to a second model, the test system comprising:

an electronic data store configured to store the second portion of the video game and the second model that corresponds to the second portion of the video game; and a hardware processor of an interactive computing system in communication with the electronic data store, the hardware processor configured to execute specific computer-executable instructions to at least:

receive an action event log from a user computing system configured to execute the first portion of the video game, wherein the action event log comprises an identity of a first set of action events triggered during execution of the first portion of the video game at the user computing system, wherein the first set of action events are performed with respect to the first model of the first portion of the video game, wherein the first set of action events cause a change in a state of the first model, and wherein the action event log further comprises an identity of the state of the first model;

execute a second set of action events corresponding to the first set of action events identified in the action event log, wherein the second set of action events are executed with respect to the second model within the second portion of the video game and corresponding to the first model, and wherein the second set of action events are executed independent of execution of the first set of action events;

determine a state of the second model subsequent to execution of the second set of action events;

compare the state of the second model to the state of the first model as identified in the action event log to obtain a comparison result; and execute a contextual action based at least in part on the comparison result.

13. The test system of claim 12, wherein the second portion of the video game comprises one of a plurality of second portions of the video game that interact with the first portion of the video game.

14. The test system of claim 12, wherein the specific computer-executable instructions comprise isomorphic code configured to execute the second set of action events.

15. The test system of claim 12, wherein, in response to determining that the comparison result indicates that the first model matches the second model, the hardware processor executes the contextual action to register an update to the state of the first model or the state of the second model.

16. The test system of claim 12, wherein, in response to determining that the comparison result indicates that the first model does not match the second model, the hardware processor executes the contextual action to replace the first model with the second model at the user computing system.

17. The test system of claim 16, wherein replacing the first model with the second model comprises modifying a current state of the first model with the state of the second model.

18. The test system of claim 12, wherein, in response to determining that the comparison result indicates that the first model does not match the second model, the hardware processor executes the contextual action to output an indication of a software bug in the video game code.

19. The test system of claim 12, wherein, in response to determining that the comparison result indicates that the first model does not match the second model, the hardware processor executes the contextual action to output an indication of an occurrence of cheating during interaction with the first portion of the video game.

20. The test system of claim 12, wherein the first set of action events comprise a series of action events performed over a first time period of interaction with the first portion of the video game.

21. The test system of claim 20, wherein the second set of action events comprise the series of action events, and wherein the second set of action events are performed over a second time period that is a fraction of a length of the first time period.

22. The test system of claim 12, wherein the interactive computing system interacts with a second instance of the first portion of the video game hosted by a second user computing system during execution of the second portion of the video game.

23. The test system of claim 12, wherein the user computing system continues to execute action events while the hardware processor is executing the second set of action events.

\* \* \* \* \*